UNITED STATES PATENT OFFICE.

HERBERT N. McCOY, OF CHICAGO, ILLINOIS, ASSIGNOR TO LINDSAY LIGHT COMPANY, OF CHICAGO, ILLINOIS, A CORPORATION OF ILLINOIS.

METHOD OF MANUFACTURING THORIUM NITRATE.

1,366,128. Specification of Letters Patent. Patented Jan. 18, 1921.

No Drawing. Application filed December 30, 1918. Serial No. 268,961.

*To all whom it may concern:*

Be it known that I, HERBERT N. McCOY, a citizen of the United States, residing at Chicago, in the county of Cook and State of Illinois, have invented a new and useful Improvement in Methods of Manufacturing Thorium Nitrate, of which the following is a specification.

The present invention relates to processes for the purification of thorium compounds and for the production of a purified thorium nitrate therefrom.

This process comprises a plurality of steps which are directed to the treatment of naturally occurring thorium-containing compounds for the concentration of the thorium content therein and its final purification. It is described in the following specification as applied to the treatment of an India monazite sand from which the greater part of the ilmenite content has already been removed by a process of magnetic separation. This product contains approximately 92% of monazite sand.

In accordance with this process, the monazite sand thus obtained is treated in batches containing approximately 460 pounds. The batch of monazite sand is first decomposed in such manner as to convert the thorium into an insoluble compound readily separable from other constituents of the monazite. This is effected in the following manner:

A batch of approximately 460 pounds of the monazite sand, already slightly concentrated by a magnetic separation process, is charged into a cast iron pot with 475 pounds of concentrated sulfuric acid (specific gravity 1.84). The pot containing this batch is then heated by means of a low gas flame, a slow heating being maintained until the material begins to stiffen, for example, for a period of about four hours. At this stage, the temperature of the material is about 180° to 200° C. The flame is then shut off and the material is allowed to cool to about 160° C., being stirred during this time. At this temperature the batch again becomes thin. This cooling process will require about four hours. The pot containing the batch is then subjected to a renewed heating for a period of from 8 to 10 hours, at the end of which time the material becomes very stiff and shows a yellow color. The heating during this period is more vigorous, a maximum temperature of approximately 300° being obtained. At this stage the heating is stopped, the contents of the pot are stirred, permitted to cool for from 4 to 6 hours and the pot is then opened and dumped. The average weight of the material dumped from a pot is about 825 pounds.

The product of four batches treated as indicated in the previous paragraph, and constituting about 3300 pounds, is then run into a tank containing 3200 gallons of cold water and is stirred for about one hour. The filtrate of a portion of this mixture will be found to have an acidity of .6 to .8 normal, using methyl-orange as an indicator. At the end of this period of stirring, a sample is taken from the tank, filtered, and tested to insure the absence of thorium in the filtrate. The contents of the tank are now decanted and filtered, preferably by means of a wooden filter press, and washed for three-quarters of an hour, or until the filtrate is no longer acid to the tongue. The filter cake thus obtained, which is designated as "the first gray mud" is a needle-like crystalline material, as viewed under a microscope and has an average weight of 1360 pounds. The thorium is contained therein as an insoluble phosphatic compound, probably thorium meta-phosphate sulfate, and is admixed with a certain percentage of rare earths and other impurities. The dried product contains about 75% thorium, calculated as thorium oxid.

The insoluble thorium phosphates of the gray mud are directly converted to insoluble thorium hydroxid as follows: 400 gallons of cold water is run into a 2000 gallon iron tank and 1000 pounds of caustic soda is added. The gray mud prepared as above described, and of the amount of 1360 pounds, representing the product of four pot-runs, is then dumped into the tank and the mixture is stirred and boiled by means of a closed steam coil for one hour. The tank is then filled with hot water, steamed to boiling and allowed to settle for two hours, at the end of which time about 800 gallons of clear liquid may be drawn off from the top of the tank. It is again filled with hot water and the material filtered through an iron press. The filter cake is thoroughly washed with hot water (65° C.) and then air-dried.

The weight of this filter cake, identified as red mud, for four pots is 700 pounds, or 175 pounds for each pot-run. In this step of the process metallic and rare earth phosphatic compounds, other than thorium, are largely separated, the dried solid now containing about 75% thorium, calculated as oxid.

The red mud produced as above described is next brought into solution as a sulfate in the following manner: The red mud from four batches (700 pounds), is divided into two equal parts, each of which is treated as follows: 50 gallons of cold water is placed in a lead-lined tank of 600 gallons capacity, 200 pounds of sulfuric acid (specific gravity 1.84) is added, and two pots (60 gallons) of waste acid hereinafter referred to as No. 2 waste acid are also added. The contents of the tank are now heated to 60°, brought up to a volume of 330 gallons with hot water and 350 pounds of the red mud is shoveled in. The volume is then brought up to 500 gallons by means of hot water. The mixture is stirred for one-half hour and allowed to settle, a temperature of approximately 60° being maintained. The total volume of the sulfate solution from the red mud from four batches is 1000 gallons.

The clear solution thus produced, containing thorium sulfate, is siphoned into a wooden tank of 2000 gals. capacity, in which thorium is further purified by selective precipitation by means of hydrofluoric acid. 150 gallons of cold water is first run in to cool the solution and 300 pounds of 30% hydrofluoric acid is added slowly, about two hours being taken to run in the entire amount. After stirring for about 45 minutes, the tank is filled with cold water and permitted to settle for one hour. The clear liquid is their siphoned off, the tank refilled with cold water and the contents then filtered, preferably through a wooden filter press. The filter cake is washed with cold water for about one-half hour and is air-dried for about an equal period. The moist filter cake, comprising chiefly thorium fluorid and designated "the second gray mud" has a weight of about 800 pounds and contains about 88% of thorium, calculated as oxid when dried.

The thorium content of this second gray mud is next further purified and concentrated by treatment with a warm soda solution, prepared as follows: 560 pounds of soda-ash and 320 pounds of sodium bicarbonate are dissolved in 600 gallons of water, heated to 55° C and contained in a 1200 gallon wooden tank. The second gray mud, approximately 800 pounds in weight, is then added to the warm soda solution, stirred for about one hour and the resulting solution filtered, preferably through an iron filter press, and air-dried. The greater portion of the fluorid is dissolved, that retained in the insoluble residue or filter cake being recovered as follows: An accumulation of the filter cake from a number of soda extractions carried out as above described may be washed with a soda solution made in the manner above described, the wash liquor being pumped back into the soda extraction tank. The average weight of the insoluble residue is approximately 15 pounds per pot, or batch. It may be further treated for the extraction of the thorium still contained therein, for example, by the method hereinafter described.

The thorium contained in the soda extraction solution from four batches, obtained as above described, is pumped into a 1500 gallon wooden tank into which 300 pounds of caustic soda dissolved in water are also run. The mixture is stirred for about one-half hour and permitted to settle for about three hours, the clear liquid being then siphoned off and the tank refilled with hot water. The precipitated hydroxid, suspended in the hot water, is then filtered, preferably through an iron filter press, washed in the press for one hour with water at approximately 65° C. and the cake air-dried for one and one-half hours. This moist filter cake, designated as "white mud", will weigh from 600 to 800 pounds, and will have a thorium concentration of about 94%, calculated as oxid. By means of the steps just described, the separation and removal of the greater part of the cerium, barium, titanium, iron, and yttrium earth compounds is effected.

The hydroxid residue or white mud thus obtained is dissolved in about 28 gallons of hydrochloric acid, specific gravity 1.19, contained in a stone jar of about 200 gallons capacity. The chlorid mixture is then pumped into a smaller stone jar and allowed to settle. Its volume will be about 100 gallons and its density will average about 30° Baumé. After settling, the chlorid solution thus obtained is siphoned through a water-cooled coil by which its temperature is reduced to about 15° C. The last few gallons passing over should be filtered.

The filtered solution, having a density of 30° Baumé and at approximately 15° C. is now divided into smaller portions and treated with a total of 24 gallons of 42° Baumé sulfuric acid at a temperature of 15° C., the acid being added slowly and the material being continually stirred. Thorium sulfate crystals are thrown out and are allowed to settle and the waste acid is siphoned off for further use. The crystals of sulfate are then dried, preferably in felt bags in a centrifugal machine, and are washed with about six gallons of ice water. The average weight of the sulfate crystals thus obtained from the 100 gallons of chlorid solution and representing the product from four original batches, is about 368 pounds, or 92 pounds per batch.

The waste acid drawn off from the crystals as above described has a volume of about 115 gallons and may be utilized for the treatment of the insoluble residue resulting from the extraction of fluorid by means of soda solution as previously described. About 100 gallons of this acid is heated to 40° C. and about 180 pounds of the insoluble residue, resulting from the soda extraction of the thorium fluorid, or second gray mud, is added thereto. The solution is allowed to settle and the clear liquid decanted into a large wooden tank of about 2000 gallons capacity. When the solution derived from the residue from a large number of batches, for example, 60, has been accumulated in this tank, hydrofluoric acid is added in quantity sufficient to just precipitate all of the thorium present. In general about 300 pounds of hydrofluoric acid would be required for the waste material from 60 original batches. The fluorid precipitated is allowed to settle, the clear solution siphoned off, the tank refilled with cold water and the contents filtered, preferably through a wooden filter press. The filter cake is treated in the same manner as the first thorium fluorid or second gray mud.

In further treatment of the sulfate crystals obtained as above described, it is found convenient to handle the product from ten original batches together, this amounting to approximately 920 pounds. This amount of the sulfate crystals is converted into the hydroxid by adding them to a solution of ammonia made by adding 54 gallons of 26% ammonia to 10 gallons of distilled water and contained in a wooden tank of about 600 gallons capacity. The mixture is stirred continually for five hours, and wash-water derived from the subsequent step of the process, as hereinafter indicated, is added, the mixture allowed to settle and the clear liquid decanted. This process is repeated for a number of times, for example, eight, using the wash-water derived from the washing of the further purified hydroxid as hereinafter described. It is finally washed with clear distilled water. The hydroxid is then pumped into a 200 gallon jar and permitted to settle, and the clear liquid siphoned off. The hydroxid is then dissolved in about 56 gallons of hydrochloric acid, or about six gallons of acid for each 100 pounds of the first sulfate crystals. The solution thus obtained may be identified as the second chlorid solution and should have a density of about 38° Baumé.

This chlorid solution is filtered through paper, for example on a stone filter, and is divided into a number of aliquot portions for convenience in further treatment. The chlorid solution is cooled and diluted by means of ice until its density is 31° Baumé, and 56 gallons of sulfuric acid (42° Baumé), are then added, the temperature being about 15° C. The sulfuric acid is added very slowly, for example over a period of one and one-half hours. Crystals of thorium sulfate are thrown out and permitted to settle, the acid solution is siphoned off and may be used for the solution of the first thorium hydroxid precipitate, or red mud. The total volume of acid derived at this point from the treatment of the product of ten original batches is about 300 gallons. This acid is called the No. 2 waste acid.

The sulfate crystals now obtained are washed with about 30 gallons of cold distilled water, preferably in a stone filter, and are dried in the filter. These sulfate crystals should dissolve perfectly in distilled water, giving a clear solution.

These sulfate crystals are now treated in the same manner as the first sulfate crystals obtained for conversion into hydroxid, distilled water being used and the number of washings being increased to twelve. Beginning with the third washing, a small quantity of ammonia is added to each wash-water, about two gallons of ammonia being added to 300 gallons of distilled water for each washing of a total amount of sulfate crystals of approximately 920 pounds. The hydroxid thus obtained is permitted to settle, the clear liquid siphoned off, the residue filtered on a stone filter, sucked dry, and washed with about fifteen gallons of distilled water. The washed hydroxid is put into a 200 gallon stone jar, and seven pounds of 142° nitric acid is added to each 11 pounds of finished dried nitrate, as calculated from the oxid contents of the second sulfate crystals taken. On an average it requires about 490 pounds of the nitric acid for a ten pot run. The nitric solution is filtered through a blotter on a stone filter and evaporated in silica dishes. This final product contains 48.2 per cent. of its own weight of oxid of thorium, as determined by direct ignition. The average weight of the thorium nitrate from 920 pounds of second sulfate crystals (representing 10 pots, or 4600 pounds of sand) is 780 pounds.

Where in the above specification the percentage concentrations of thorium oxid are stated without other qualification the figure given indicates the percentage of thorium oxid in the total metal oxids present in the material, all the metals present being calculated as oxids.

For the purpose of clear and adequate description of my invention I have described my process in its details in connection with the treatment of a specific character of material and in specific amounts. It is readily apparent that the principles of my invention are not limited to the specific type of material or to the specific amounts and concentrations of reagents recited above, these being merely exemplary. It is also readily apparent that my process may be applied to thorium-containing compounds of other types in which the thorium is associated with other metals and particularly with rare earth metals.

I claim as my invention:

1. The process for the production of purified thorium compounds from monazite sand which consists in treating said monazite sand with concentrated sulfuric acid to produce an insoluble thorium compound, removing soluble impurities associated therewith and directly converting said insoluble thorium compound into thorium hydroxid.

2. The process for the production of purified thorium compounds from monazite sand which consists in treating said monazite sand with concentrated sulfuric acid to produce an insoluble thorium compound, removing soluble impurities associated therewith, directly converting said insoluble thorium compound into thorium hydroxid, dissolving said hydroxid as sulfate, and re-precipitating the thorium as a fluorid.

3. The process for the production of purified thorium compounds from monazite sand which consists in treating said sand with concentrated sulfuric acid to produce an insoluble thorium compound, removing soluble impurities associated therewith, converting the insoluble thorium compound into thorium hydroxid, dissolving the hydroxid and selectively precipitating the thorium from this solution.

4. The process for the production of purified thorium compounds from monazite sand which consists in treating said monazite sand with concentrated sulfuric acid to produce an insoluble thorium compound, removing soluble impurities associated therewith, directly converting said insoluble thorium compound into thorium hydroxid, dissolving said hydroxid as sulfate, re-precipitating the thorium as a fluorid, and extracting said fluorid with a sodium carbonate solution.

5. The process for the production of purified thorium compounds from monazite sand which consists in treating said monazite sand with concentrated sulfuric acid to produce an insoluble thorium compound, removing soluble impurities associated therewith, directly converting said insoluble thorium compound into thorium hydroxid, dissolving said hydroxid as sulfate, re-precipitating the thorium as a fluorid, extracting said fluorid with a sodium carbonate solution, and effecting precipitation of the thorium from said solution as hydroxid.

6. In the process of producing purified thorium compounds from a natural phosphate containing mineral, subjecting the mineral to the action of strong sulfuric acid, thereby forming an insoluble thorium compound, removing soluble impurities therefrom, and converting the insoluble thorium compound into thorium hydroxid.

HERBERT N. McCOY.